US011496405B2

(12) United States Patent
Ji et al.

(10) Patent No.: US 11,496,405 B2
(45) Date of Patent: Nov. 8, 2022

(54) METHOD AND APPARATUS FOR TRANSMITTING SERVICE FLOW BASED ON FLEXIBLE ETHERNET, AND COMMUNICATION SYSTEM

(71) Applicant: Huawei Technologies Co., Ltd., Shenzhen (CN)

(72) Inventors: Rensheng Ji, Dongguan (CN); Yun Chen, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 29 days.

(21) Appl. No.: 17/308,529

(22) Filed: May 5, 2021

(65) Prior Publication Data
US 2021/0258262 A1 Aug. 19, 2021

Related U.S. Application Data

(63) Continuation of application No. 16/453,607, filed on Jun. 26, 2019, now Pat. No. 11,018,985, which is a
(Continued)

(30) Foreign Application Priority Data

Dec. 26, 2016 (CN) .......................... 201611216544.7

(51) Int. Cl.
*H04L 47/525* (2022.01)
*H04L 47/32* (2022.01)
(Continued)

(52) U.S. Cl.
CPC ............ *H04L 47/525* (2013.01); *H04L 47/32* (2013.01); *H04L 47/41* (2013.01); *H04L 47/6275* (2013.01); *H04L 47/822* (2013.01)

(58) Field of Classification Search
None
See application file for complete search history.

(56) References Cited

U.S. PATENT DOCUMENTS

| 8,848,533 B1 | 9/2014 | Stuart et al. |
| 2016/0119076 A1 | 4/2016 | Gareau |
| | (Continued) | |

FOREIGN PATENT DOCUMENTS

| CN | 105429840 A | 3/2016 |
| EP | 3013017 A1 | 4/2016 |
| | (Continued) | |

OTHER PUBLICATIONS

Huawei Technologies Co., Ltd., "FlexE aware mapping method 6B text proposal," International Telecommunication Union, COM 15-C 1670 R2-E, Feb. 2016, 7 pages.
(Continued)

*Primary Examiner* — Otis L Thompson, Jr.
(74) *Attorney, Agent, or Firm* — Slater Matsil, LLP

(57) ABSTRACT

A method and apparatus for transmitting a service flow based on a flexible Ethernet, where a bandwidth resource corresponding to a bundling group (BG) of a flexible Ethernet is divided into M timeslots, service data of a service flow is encapsulated in N timeslots in the M timeslots, and the method includes: when a first PHY in the BG fails, determining, based on a preconfigured first timeslot configuration table (TCT), a target timeslot (TTS) in the N timeslots that is mapped to the first PHY; searching the M timeslots for an idle timeslot (ITS) based on the first TCT; adjusting the first TCT when a quantity of ITSs is greater than or equal to a quantity of TTSs, so that all the N timeslots are mapped to PHYs other than the first PHY; and transmitting the service flow by using the mapped PHYs of the bundling group.

20 Claims, 8 Drawing Sheets

Related U.S. Application Data continuation of application No. PCT/CN2017/101504, filed on Sep. 13, 2017.

(51) Int. Cl.
*H04L 47/41* (2022.01)
*H04L 47/6275* (2022.01)
*H04L 47/70* (2022.01)

(56) References Cited

U.S. PATENT DOCUMENTS

| | | |
|---|---|---|
| 2017/0006360 A1 | 1/2017 | Gareau |
| 2017/0093757 A1* | 3/2017 | Gareau ............... H04J 3/065 |
| 2017/0171163 A1* | 6/2017 | Gareau ............ H04L 9/0637 |
| 2018/0167160 A1* | 6/2018 | Gareau ............ H04L 1/0041 |
| 2019/0173856 A1 | 6/2019 | Gareau et al. |
| 2019/0349311 A1 | 11/2019 | Ji et al. |
| 2020/0007255 A1* | 1/2020 | Gareau ............... H04J 3/1611 |
| 2020/0412813 A1 | 12/2020 | Mong et al. |

FOREIGN PATENT DOCUMENTS

| | | |
|---|---|---|
| JP | 2010171562 A | 8/2010 |
| JP | 2014531808 A | 11/2014 |
| KR | 20060082217 A | 7/2006 |
| KR | 20100073068 A | 7/2010 |
| KR | 101041235 B1 | 6/2011 |
| WO | 2016084953 A1 | 6/2016 |

OTHER PUBLICATIONS

International Telecommunication Union, Huawei Technologies Co., Ltd., "Introduction to Flexible Ethernet and its application in IP/MPLS network," Focus Group on IMT-2020, Geneva, Dec. 5-9, 2016, IMT-I-230, Rev. 3, Study Period 2013-2016, 11 pages.

International Telecommunication Union, "Huawei Technologies Co., Ltd., FlexE aware mapping method 6B text proposal;C 1670 R2," COM 15-C 1670 R2-E, Feb. 2016, vol. 11/15Study Group 15—Contribution 1670, Telecommunication Standardization Sector, Study Period 2013-2016, 7 pages.

Trowbridge, Stephen J, "Flex Ethernet Implementation Agreement 1.0," Optical Internetworking Forum, IA OIF-FLEXE-01.0, Working Group: Physical and Link Layer, Mar. 2016, 31 pages.

\* cited by examiner

METHOD AND APPARATUS FOR TRANSMITTING SERVICE FLOW BASED ON FLEXIBLE ETHERNET, AND COMMUNICATION SYSTEM

CROSS-REFERENCE TO RELATED APPLICATIONS

The application is a continuation of U.S. patent application Ser. No. 16/453,607, filed on Jun. 26, 2019, which is a continuation of International Application No. PCT/CN2017/101504, filed on Sep. 13, 2017, which claims priority to Chinese Patent Application No. 201611216544.7, filed on Dec. 26, 2016. All of the aforementioned patent applications are hereby incorporated by reference in their entireties.

TECHNICAL FIELD

The application relates to the field of flexible Ethernet technologies, and more specifically, to a method and apparatus for transmitting a service flow based on a flexible Ethernet, and a communications system.

BACKGROUND

A flexible Ethernet (Flex Eth or FlexE for short) is a more advanced Ethernet technology developed based on a conventional Ethernet. The FlexE may be used to define a variable rate interface between a router and an optical transport network (OTN), and is mainly used to simplify mapping and transmission modes of an Ethernet interface in the OTN as far as possible. The FlexE may implement a greater transmission rate and a greater transmission bandwidth based on a rate binding technology and a flexible mapping manner between the Ethernet interface and the OTN.

As shown in FIG. 1, a concept of a flexible Ethernet bundling group (FlexE Group, bundling group for short) is introduced to the FlexE based on a conventional Ethernet. The bundling group may be obtained by bundling a plurality of PHYs. A bandwidth resource corresponding to one bundling group is a sum of bandwidth resources corresponding to PHYs in the bundling group. Therefore, the FlexE can meet requirements for a greater transmission rate and a greater transmission bandwidth based on the bundling group.

The FlexE enables a plurality of service flows to be transmitted concurrently by using the bundling group. Service data of a same service flow may be carried on one PHY in the bundling group, or may be carried on different PHYs in the bundling group. In other words, service data of a same service flow may be transmitted to a peer end by using one PHY in the bundling group, or may be transmitted to a peer end by using a plurality of PHYs in the bundling group. Assuming that a PHY in the bundling group carries service data of one or more service flows, transmission of the one or more service flows is interrupted if the PHY fails.

SUMMARY

The application provides a method and apparatus for transmitting a service flow based on a flexible Ethernet, and a communications system, to mitigate a phenomenon in which a service flow is interrupted because a PHY in a bundling group fails.

According to a first aspect, a method for transmitting a service flow based on a flexible Ethernet is provided, where the flexible Ethernet transmits at least one service flow by using a bundling group, a bandwidth resource corresponding to the bundling group is divided into M timeslots, service data of the at least one service flow is encapsulated in N timeslots in the M timeslots, each timeslot in the N timeslots is mapped to one PHY in the bundling group, and service data encapsulated in each timeslot is transmitted by using a PHY to which the timeslot is mapped, where both M and N are integers greater than or equal to 1, and M≥N; and the method includes: when a first PHY in the bundling group fails, determining, based on a preconfigured first timeslot configuration table, a target timeslot in the N timeslots that is mapped to the first PHY, where the first timeslot configuration table is used to indicate a mapping relationship between the M timeslots and PHYs in the bundling group; searching the M timeslots for an idle timeslot based on the first timeslot configuration table; adjusting the first timeslot configuration table when a quantity of idle timeslots in the M timeslots is greater than or equal to a quantity of target timeslots, so that all the N timeslots are mapped to other PHYs other than the first PHY in the bundling group, to obtain a second timeslot configuration table; and transmitting the at least one service flow based on the second timeslot configuration table by using the bundling group.

With reference to the first aspect, in some implementations of the first aspect, the adjusting the first timeslot configuration table when a quantity of idle timeslots in the M timeslots is greater than or equal to a quantity of target timeslots includes: selecting K idle timeslots from the M timeslots when the quantity of idle timeslots in the M timeslots is greater than or equal to the quantity of target timeslots, where K is equal to the quantity of target timeslots; and adjusting the first timeslot configuration table, so that a mapping relationship between the K idle timeslots and PHYs in the bundling group and a mapping relationship between the K target timeslots and PHYs in the bundling group are interchangeable.

With reference to the first aspect, in some implementations of the first aspect, the selecting K idle timeslots from the M timeslots when the quantity of idle timeslots in the M timeslots is greater than or equal to the quantity of target timeslots includes: selecting the K idle timeslots from the M timeslots based on load conditions of the other PHYs when the quantity of idle timeslots in the M timeslots is greater than or equal to the quantity of target timeslots.

With reference to the first aspect, in some implementations of the first aspect, the at least one service flow includes a plurality of service flows, and the method further includes: calculating a current transmission bandwidth of the bundling group when the quantity of idle timeslots in the M timeslots is less than the quantity of target timeslots, where the current transmission bandwidth of the bundling group is equal to a sum of transmission bandwidths of the other PHYs other than the first PHY in the bundling group; and discarding a target service flow in the plurality of service flows based on the current transmission bandwidth of the bundling group and a transmission bandwidth required for the plurality of service flows, so that a transmission bandwidth required for a remaining service flow other than the target service flow in the plurality of service flows is less than or equal to the current transmission bandwidth of the bundling group.

With reference to the first aspect, in some implementations of the first aspect, the discarding a target service flow in the plurality of service flows based on the current transmission bandwidth of the bundling group and a transmission bandwidth required for the plurality of service flows includes: discarding, by using a quality of service QoS mechanism of the flexible Ethernet, the target service flow in the plurality of service flows based on the current transmission bandwidth of the bundling group and the transmission bandwidth required for the plurality of service flows, where a priority of the target service flow is lower than a priority of the remaining service flow other than the target service flow in the plurality of service flows.

According to a second aspect, a flexible Ethernet-based service flow transmission apparatus is provided, including modules configured to perform the method in the first aspect or the various possible implementations of the first aspect.

According to a third aspect, a flexible Ethernet-based service flow transmission apparatus is provided, including a memory, a processor, and a communications interface, where the memory is configured to store program code, and the processor is configured to execute the program code stored in the memory, to perform operations corresponding to the method in the first aspect or the various possible implementations of the first aspect.

According to a fourth aspect, a communications system is provided, including a flexible Ethernet-based network device, where the flexible Ethernet transmits at least one service flow by using a bundling group, a bandwidth resource corresponding to the bundling group is divided into M timeslots, service data of the at least one service flow is encapsulated in N timeslots in the M timeslots, each timeslot in the N timeslots is mapped to one PHY in the bundling group, and service data encapsulated in each timeslot is transmitted by using a PHY to which the timeslot is mapped, where both M and N are integers greater than or equal to 1, and M≥N. The network device is configured to: when a first PHY in the bundling group fails, determine, based on a preconfigured first timeslot configuration table, a target timeslot in the N timeslots that is mapped to the first PHY, where the first timeslot configuration table is used to indicate a mapping relationship between the M timeslots and PHYs in the bundling group. The network device is further configured to: search the M timeslots for an idle timeslot based on the first timeslot configuration table, and adjust the first timeslot configuration table when a quantity of idle timeslots in the M timeslots is greater than or equal to a quantity of target timeslots, so that all the N timeslots are mapped to other PHYs other than the first PHY in the bundling group, to obtain a second timeslot configuration table. The network device is further configured to transmit the at least one service flow based on the second timeslot configuration table by using the bundling group.

With reference to the fourth aspect, in some implementations of the fourth aspect, the network device is specifically configured to: select K idle timeslots from the M timeslots when the quantity of idle timeslots in the M timeslots is greater than or equal to the quantity of target timeslots, where K is equal to the quantity of target timeslots; and adjust the first timeslot configuration table, so that a mapping relationship between the K idle timeslots and PHYs in the bundling group and a mapping relationship between the K target timeslots and PHYs in the bundling group are interchangeable.

With reference to the fourth aspect, in some implementations of the fourth aspect, the network device is specifically configured to select the K idle timeslots from the M timeslots based on load conditions of the other PHYs when the quantity of idle timeslots in the M timeslots is greater than or equal to the quantity of target timeslots.

With reference to the fourth aspect, in some implementations of the fourth aspect, the at least one service flow includes a plurality of service flows, and the network device is further configured to: calculate a current transmission bandwidth of the bundling group when the quantity of idle timeslots in the M timeslots is less than the quantity of target timeslots, where the current transmission bandwidth of the bundling group is equal to a sum of transmission bandwidths of the other PHYs other than the first PHY in the bundling group; and discard a target service flow in the plurality of service flows based on the current transmission bandwidth of the bundling group and a transmission bandwidth required for the plurality of service flows, so that a transmission bandwidth required for a remaining service flow other than the target service flow in the plurality of service flows is less than or equal to the current transmission bandwidth of the bundling group.

With reference to the fourth aspect, in some implementations of the fourth aspect, the network device is specifically configured to discard, by using a quality of service QoS mechanism of the flexible Ethernet, the target service flow in the plurality of service flows based on the current transmission bandwidth of the bundling group and the transmission bandwidth required for the plurality of service flows, where a priority of the target service flow is lower than a priority of the remaining service flow other than the target service flow in the plurality of service flows.

According to a fifth aspect, a computer readable medium is provided, where the computer readable medium stores program code, and the program code includes an instruction used to perform the method in the first aspect or the various possible implementations of the first aspect.

In the solution, when the first PHY in the bundling group fails, the timeslots are first searched for the idle timeslot, and the first timeslot configuration table is adjusted when the quantity of idle timeslots is sufficient, so that all the N timeslots carrying the service data are mapped to other valid PHYs in the bundling group. In this way, all the service data encapsulated in the N timeslots can be smoothly transmitted to a receiving end, and service flow interruption is avoided.

DETAILED DESCRIPTION OF ILLUSTRATIVE EMBODIMENTS

In a conventional Ethernet, after passing through a switching board, a service flow usually sequentially passes through modules or components such as a traffic management (TM) module, a network processor (NP), a media access control (MAC) layer module, and a physical layer module (or referred to as a PHY) for processing.

The TM module mainly controls quality of service (QoS) of the service flow based on a network transmission bandwidth and a priority of the service flow. For example, if a current transmission bandwidth is insufficient to ensure that all service flows pass through the foregoing modules or components, the TM module may preferentially ensure that a service flow with a high priority passes through the foregoing modules or components, and perform packet discarding processing on a service flow with a low priority.

The NP is a core chip for processing an Ethernet service, and mainly performs forwarding and processing tasks for various Ethernet services, for example, performs packet processing, protocol analysis, route searching, and the like on Ethernet service data.

The MAC layer module is mainly responsible for connecting and controlling a physical medium at a physical layer. For an Ethernet service packet, physical layer information may be encapsulated and decapsulated at the layer.

The PHY may be defined as providing mechanical, electronic, functional, and normative characteristics for setting up, maintaining, and tearing down a physical link that is required for data transmission. The PHY mentioned in the specification may include physical layer working components at a transmitting end and a receiving end, and an optical fiber between the transmitting end and the receiving end. The physical layer working components may include, for example, a physical layer interface device in the Ethernet.

Figure 1:
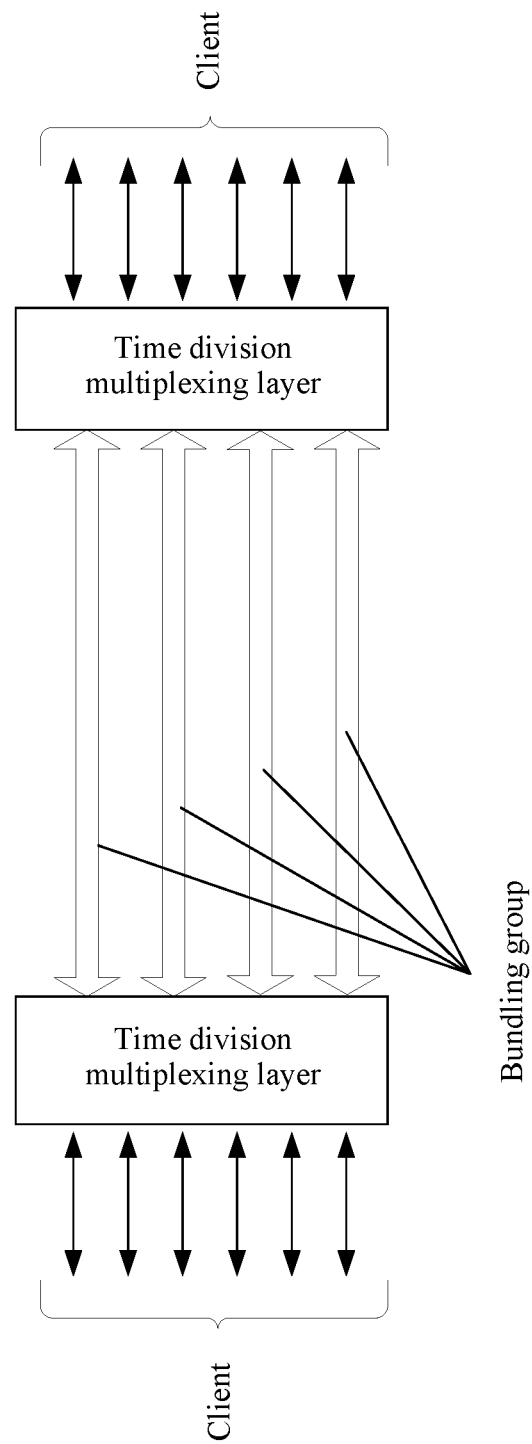
FIG. 1 is an architectural diagram of an existing flexible Ethernet.

Referring to FIG. 1, new concepts such as a bundling group, a flexible Ethernet client (FlexE Client, client for short), a timeslot (Calendar), and a flexible Ethernet time division multiplexing layer (FlexE Shim, time division multiplexing layer for short) are introduced to a FlexE based on a conventional Ethernet.

Bundling group: The bundling group may include a plurality of PHYs, for example, may include 1 to 256 PHYs that support a rate of 100 GE.

Client: Clients that perform transmission by using a same bundling group need to share a same clock, and these clients need to perform adaptation based on an allocated timeslot rate. Bandwidth overheads of each client may be adapted by inserting/deleting an idle block.

Timeslot: A bandwidth resource of one PHY is usually divided into a plurality of timeslots (for example, 20 timeslots). In actual use, service data is first encapsulated in a timeslot, and then the timeslot is mapped to a PHY in a bundling group. A mapping relationship between the timeslot and the PHY is recorded in a timeslot configuration table of the FlexE. The FlexE usually supports two timeslot configuration tables. One timeslot configuration table is a timeslot configuration table that is currently in use, and the other timeslot configuration table may be used as an alternative. The two timeslot configuration tables may be switched to each other. A specific switching time may be negotiated by an upstream client and a downstream client, and switching is performed synchronously. In this way, when a service configuration of a client changes, a service of another client is not affected.

Time division multiplexing layer: The time division multiplexing layer is mainly used to perform slicing on service data based on a same clock, and encapsulate sliced service data in a timeslot that is obtained through division performed in advance, and then map timeslots that are obtained through division to PHYs in a bundling group based on a preconfigured timeslot configuration table (may be specifically configured by a user) for transmission. Each timeslot is mapped to one PHY in the bundling group.

Figure 2:
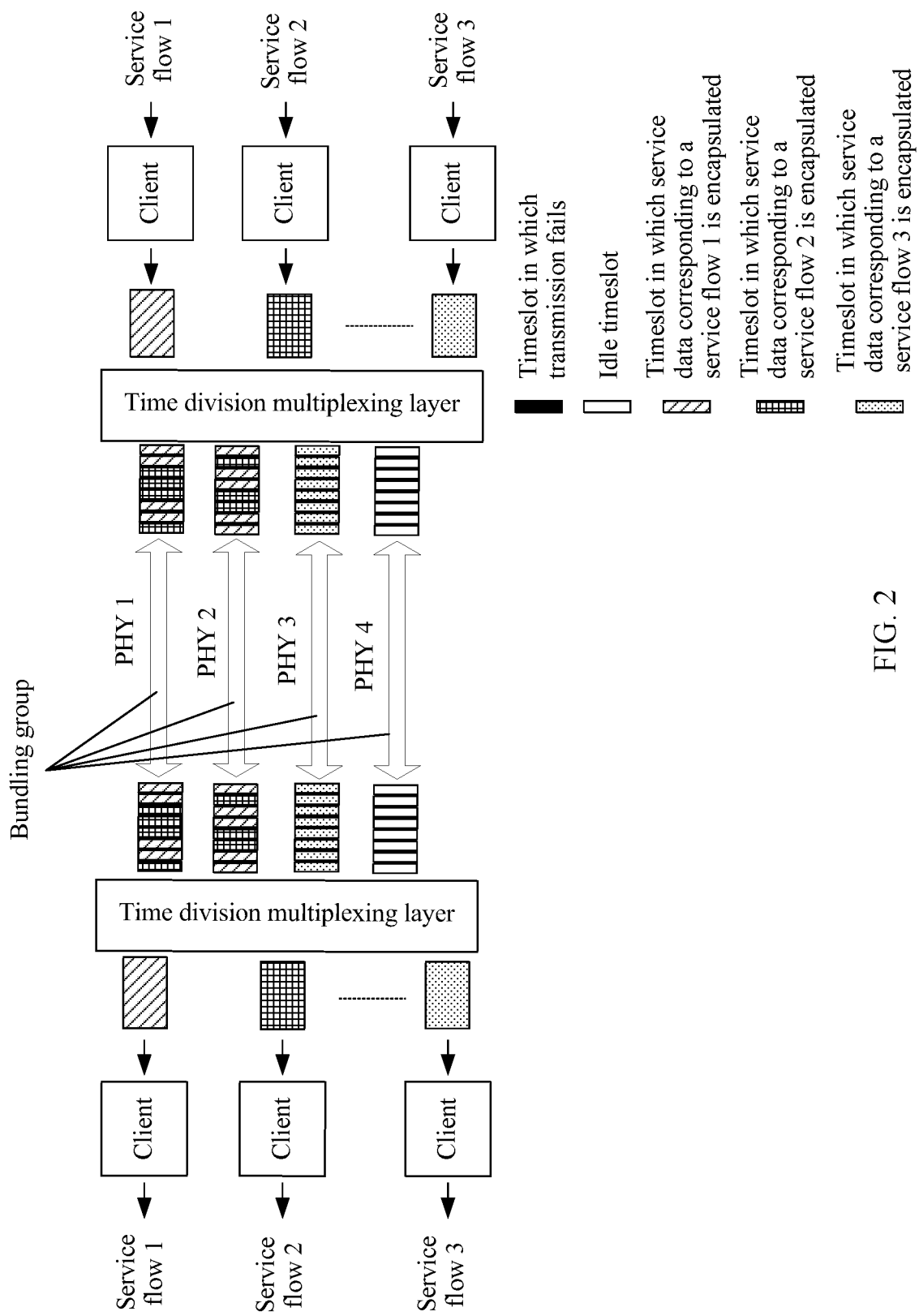
FIG. 2 is a schematic diagram of a conventional service flow processing procedure in a flexible Ethernet.
Figure 3:
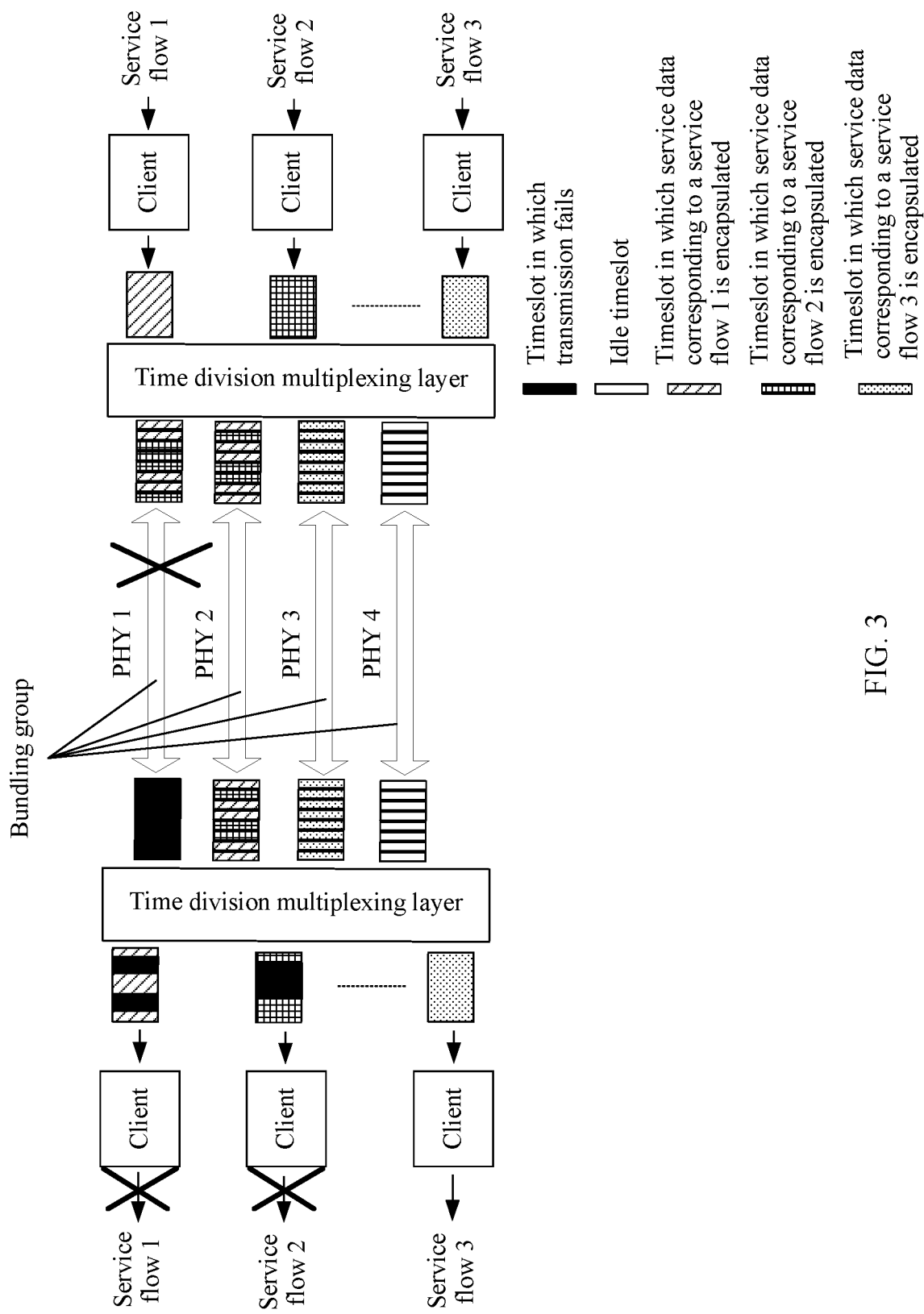
FIG. 3 is a schematic diagram of a scenario in which a service flow is interrupted due to a PHY failure.

With reference to FIG. 2 and FIG. 3, the following separately describes, by using examples, a conventional service flow processing process in a flexible Ethernet and a phenomenon in which a service flow is interrupted when a PHY fails.

FIG. 2 describes a conventional FlexE service flow processing process.

As shown in FIG. 2, a bundling group includes PHYs 1 to 4, and the bundling group may be used to transmit service flows 1 to 3. A process of transmitting the service flow 1 is used as an example. On a sending side, conventional service processing may be first performed on the service flow 1 of a client. For example, QoS control may be performed by using a TM module, and then physical layer information may be encapsulated by using a MAC layer module. The client sends, to a time division multiplexing layer, service data that is obtained after processing.

Then, the time division multiplexing layer may perform slicing and timeslot encapsulation on the received service data (to be specific, encapsulate the service data in a timeslot that is obtained through division performed in advance). Further, the time division multiplexing layer may map, to a PHY in the bundling group based on a preconfigured timeslot configuration table, a timeslot in which service data of the service flow 1 is encapsulated. As shown in FIG. 2, timeslots in which the service data of the service flow 1 is encapsulated are mapped to the PHY 1 and the PHY 2. Then, the PHYs in the bundling group may transmit the data to a receiving end by using an optical module. The receiving end re-assembles, into a service flow according to an inverse process of a processing process on the transmitting end, the data transmitted by the PHYs in the bundling group.

Processing processes of the service flows 2 and 3 are similar to that of the service flow 1. Details are not described herein.

Referring to FIG. 3, a PHY 1 in a bundling group fails, and both service data corresponding to a service flow 1 and service data corresponding to a service flow 2 are encapsulated in timeslots mapped to the PHY 1. Therefore, all the service data encapsulated in the timeslots fails to be transmitted to a receiving end due to a failure of the PHY 1. It can also be learned from service flows received at the receiving end that the service flow 1 and the service flow 2 are discontinuous or interrupted (this phenomenon is indicated by black blocks in FIG. 3). This leads to a transmission failure of the entire service flow.

To mitigate a phenomenon in which the entire service flow is interrupted due to a PHY failure, an embodiment of the application provides a method for transmitting a service flow based on a flexible Ethernet. The following describes in detail the method embodiment of the application with reference to FIG. 4.

Figure 4:
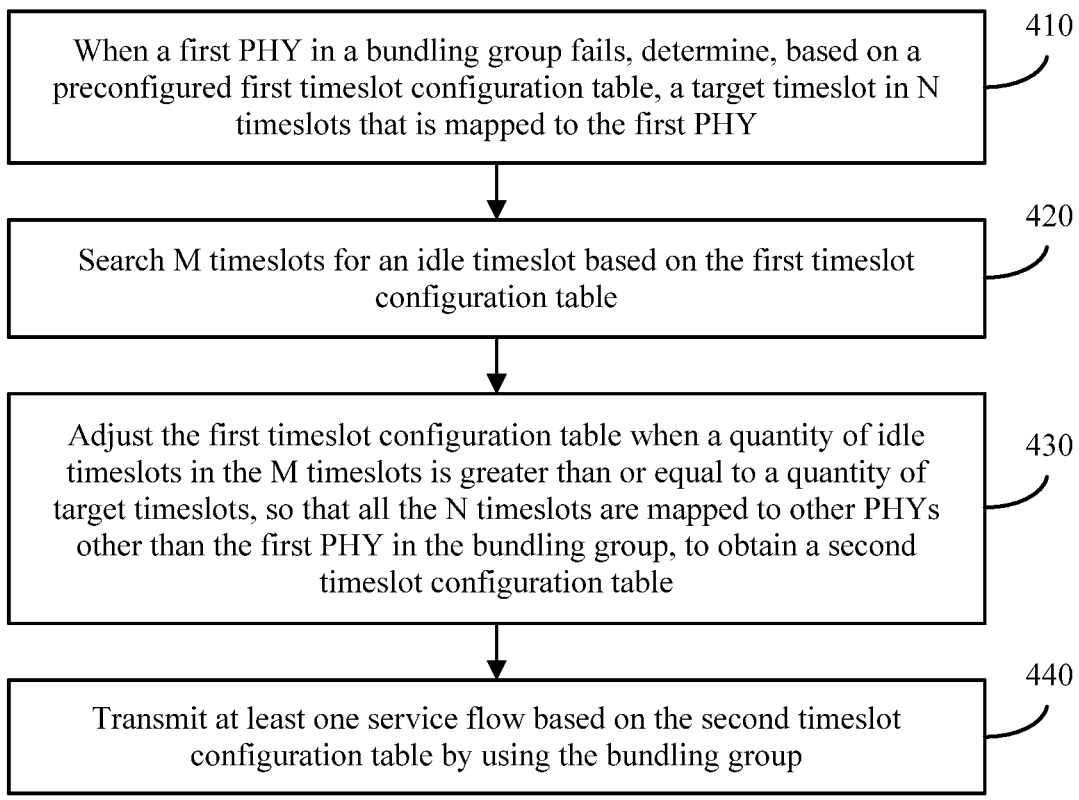
FIG. 4 is a schematic flowchart of a method for transmitting a service flow based on a flexible Ethernet according to an embodiment of the application.

FIG. 4 is a schematic flowchart of a method for transmitting a service flow based on a flexible Ethernet according to an embodiment of the application. The flexible Ethernet transmits at least one service flow by using a bundling group, a bandwidth resource corresponding to the bundling group is divided into M timeslots, service data of the at least one service flow is encapsulated in N timeslots in the M timeslots, each timeslot in the N timeslots is mapped to one PHY in the bundling group, and service data encapsulated in each timeslot is transmitted by using a PHY to which the timeslot is mapped. Both M and N are integers greater than or equal to 1, and M≥N. Actually, the flexible Ethernet divides a bandwidth resource of each PHY into a plurality of timeslots (for example, a bandwidth resource of one PHY may be divided into 20 timeslots). The foregoing M timeslots may be a sum of timeslots that are obtained by dividing all PHYs in the bundling group.

The method in FIG. 4 includes the following steps.

410. When a first PHY in the bundling group fails, determine, based on a preconfigured first timeslot configuration table, a target timeslot in the N timeslots that is mapped to the first PHY, where the first timeslot configuration table is used to indicate a mapping relationship between the M timeslots and PHYs in the bundling group.

It should be understood that the first PHY may be any PHY in the bundling group.

It should be understood that a timeslot configuration table may also be referred to as a timeslot mapping relationship table. The timeslot configuration table may be specifically used to indicate a specific PHY that is in the bundling group and to which each timeslot in the M timeslots is mapped.

420. Search the M timeslots for an idle timeslot based on the first timeslot configuration table.

430. Adjust the first timeslot configuration table when a quantity of idle timeslots in the M timeslots is greater than or equal to a quantity of target timeslots, so that all the N timeslots are mapped to other PHY(s) other than the first PHY in the bundling group, to obtain a second timeslot configuration table.

440. Transmit at least one service flow based on the second timeslot configuration table by using the bundling group.

If the first PHY in the bundling group fails, service data encapsulated in a timeslot mapped to the first PHY cannot be transmitted to a receiving end. Consequently, one or more service flows are interrupted. To avoid service flow interruption, in the embodiment of the application, the M timeslots that are obtained through division performed in advance are first searched for the idle timeslot, and the first timeslot configuration table is adjusted when the quantity of idle timeslots is sufficient, so that all the N timeslots carrying the service data are mapped to other valid PHYs in the bundling group. In this way, all the service data encapsulated in the N timeslots can be smoothly transmitted to the receiving end, and service flow interruption is avoided.

Adjustment of the timeslot configuration table and switching of timeslot configuration tables between a transmitting end and the receiving end may be implemented based on a FlexE overhead mechanism. For ease of understanding, the FlexE overhead mechanism is first briefly described.

Specifically, a PHY in the bundling group not only transmits an information code block, but also transmits an overhead code block. Bit information included in several overhead code blocks (for example, overhead code blocks transmitted in one basic frame period) is combined to form an overhead area. The overhead area may be used to transmit information other than the service data, such as code information and control information. The timeslot configuration table and information that is used for switching the timeslot configuration tables between the transmitting end and the receiving end by using a request/response mechanism may be carried in some fields in the overhead area for transmission. For details, refer to the prior art, and the details are not described herein.

There may be a plurality of implementations of step 430. The following describes in detail an implementation of step 430 with reference to a specific embodiment.

In some embodiments, step 430 may include: selecting K idle timeslots from the M timeslots when the quantity of idle timeslots in the M timeslots is greater than or equal to the quantity of target timeslots, where K is equal to the quantity of target timeslots; and adjusting the first timeslot configuration table, so that a mapping relationship between the K idle timeslots and PHYs in the bundling group and a mapping relationship between the K target timeslots and PHYs in the bundling group are interchangeable.

Because other timeslots other than the K target timeslots in the N timeslots are not mapped to the first PHY, transmission of service data in these timeslots is not affected. Based on this, in the embodiment of the application, a mapping relationship of these timeslots remains unchanged, and only the mapping relationship of the K idle timeslots and the mapping relationship of the K target timeslots are replaced or interchanged. In this way, the timeslot configuration table may be changed slightly, and an operation on the transmitting end is simplified.

For example, the bundling group includes PHYs 1 to 4, and the PHY 1 fails. The K target timeslots include a target timeslot 1 and a target timeslot 2, the K idle timeslot includes an idle timeslot 1 and an idle timeslot 2, and all the K target timeslots are mapped to the PHY 1. Assuming that the idle timeslot 1 is mapped to the PHY 2, and the idle timeslot 2 is mapped to the PHY 3, that the mapping relationship between the K idle timeslots and the PHYs in the bundling group and the mapping relationship between the K target timeslots and the PHYs in the bundling group are interchangeable may indicate that the target timeslot 1 is mapped to the PHY 2, the target timeslot 2 is mapped to the PHY 3, and both the idle timeslot 1 and the idle timeslot 2 are mapped to the PHY 1.

Figure 5:
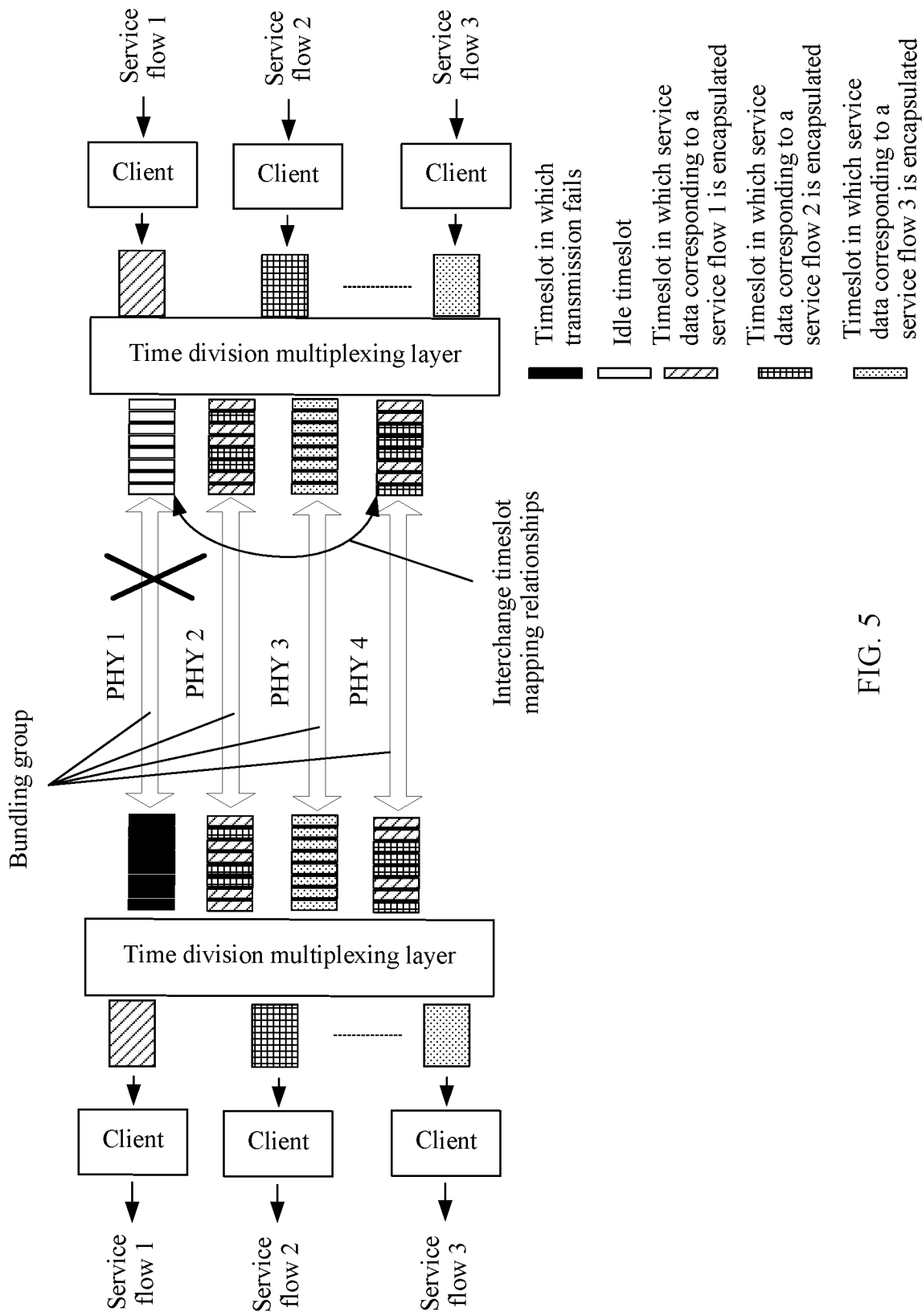
FIG. 5 is a schematic flowchart of a method for transmitting a service flow based on a flexible Ethernet according to an embodiment of the application.

The following describes in more detail the foregoing implementation of step 430 with reference to FIG. 3 and FIG. 5.

As shown in FIG. 3, the bundling group includes PHYs 1 to 4, a bandwidth resource corresponding to the bundling group is divided into 32 timeslots, each PHY is corresponding to eight timeslots in the 32 timeslots, and service flows 1 to 3 are encapsulated in 24 timeslots (the 24 timeslots are timeslots corresponding to PHYs 1 to 3, and eight timeslots on the PHY 4 are idle timeslots) in the 32 timeslots.

When the PHY 1 fails, all service data in eight timeslots mapped to the PHY 1 is affected. Referring to FIG. 3, the service data mapped to the PHY 1 not only includes the service data in the service flow 1, but also includes the service data in the service flow 2. Therefore, transmission of the service flow 1 and transmission of the service flow 2 are interrupted.

To avoid service flow transmission interruption, when the PHY 1 fails, a transmitting end finds, by searching a timeslot configuration table, that the 32 timeslots obtained through division performed in advance include eight idle timeslots, and the eight idle timeslots are mapped to the PHY 4. Therefore, referring to FIG. 5, the transmitting end may re-map, to the PHY 4, the eight timeslots mapped to the PHY 1, and re-map, to the PHY 1, the idle timeslots mapped to the PHY 4. This is equivalent to replacing or interchanging a mapping relationship of the eight timeslots mapped to the PHY 1 and a mapping relationship of the eight timeslots mapped to the PHY 4. After the mapping relationships of the timeslots are adjusted, a new timeslot configuration table may be obtained. The transmitting end may write the new timeslot configuration table to hardware of a FlexE. The FlexE transfers the new timeslot configuration table to a receiving end based on an overhead mechanism of the FlexE, and controls, based on the overhead mechanism of the FlexE, the transmitting end and the receiving end to enable the new timeslot configuration table. After the foregoing adjustments, 24 timeslots in which service data is encapsulated may be smoothly transmitted to the receiving end, and service flow interruption is avoided.

It should be noted that when the PHY 1 fails, if no affected timeslot is found by the transmitting end based on the timeslot configuration table, it indicates that the PHY 1 does not carry any service. In this case, the transmitting end may not perform the subsequent operations.

It should be understood that there may be a plurality of manners of selecting the K idle timeslots from the M timeslots. For example, the K idle timeslots may be randomly selected or may be selected according to a specific rule. The embodiment of the application imposes no specific limitation thereto.

For example, in some embodiments, the selecting K idle timeslots from the M timeslots when the quantity of idle timeslots in the M timeslots is greater than or equal to the quantity of target timeslots may include: selecting the K idle timeslots from the M timeslots based on load conditions of the other PHYs when the quantity of idle timeslots in the M timeslots is greater than or equal to the quantity of target timeslots.

In the embodiment of the application, selecting the idle timeslots based on the load conditions of the other PHYs may make service data distribution on the other PHYs more proper. For example, the K idle timeslots may be selected from the M timeslots according to a load balancing rule, so that service data in the K target timeslots is carried on lightly loaded PHYs as far as possible after the mapping relationship of the K idle timeslots and the mapping relationship of the K target timeslots are interchanged.

In the foregoing embodiment, the mapping relationship of the other timeslots other than the K target timeslots in the N timeslots remains unchanged, and only the mapping relationship of the K target timeslots and the mapping relationship of the K idle timeslots are interchanged. However, the embodiment of the application is not limited thereto. A mapping relationship of each timeslot in the N timeslots may also be adjusted based on a specific policy or rule. Description is provided by using an example in which a bundling group includes PHYs 1 to 4 and service flows transmitted by using the bundling group are encapsulated in eight timeslots (timeslots 1 to 8). Assuming that the PHY 1 fails, the timeslot 1 may be mapped to the PHY 2, the timeslot 2 may be mapped to the PHY 3, the timeslot 3 may be mapped to the PHY 4, the timeslot 4 may be mapped to the PHY 2, the timeslot 5 may be mapped to the PHY 3, the timeslot 6 may be mapped to the PHY 4, and mapping is circularly performed until a mapping relationship between the timeslot 8 and a PHY in the bundling group is determined.

The foregoing describes in detail, with reference to specific embodiments, how to transmit a service flow when the quantity of idle timeslots in the M timeslots is greater than or equal to the quantity of target timeslots. The following describes in detail, with reference to specific embodiments, how to transmit a service flow when the quantity of idle timeslots in the M timeslots is less than the quantity of target timeslots.

Optionally, in some embodiments, the at least one service flow transmitted by using the bundling group may include a plurality of service flows, and the method in FIG. 4 may further include: calculating a current transmission bandwidth of the bundling group when the quantity of idle timeslots in the M timeslots is less than the quantity of target timeslots, where the current transmission bandwidth of the bundling group is equal to a sum of transmission bandwidths of the other PHYs other than the first PHY in the bundling group; and discarding a target service flow in the plurality of service flows based on the current transmission bandwidth of the bundling group and a transmission bandwidth required for the plurality of service flows, so that a transmission bandwidth required for a remaining service flow other than the target service flow in the plurality of service flows is less than or equal to the current transmission bandwidth of the bundling group.

It should be understood that a transmission bandwidth of the bundling group decreases due to impact of a failure of the first PHY. That the quantity of idle timeslots in the M timeslots is less than the quantity of target timeslots indicates that the current transmission bandwidth of the bundling group is less than a transmission bandwidth required for a plurality of to-be-transmitted service flows due to the impact of the failure of the first PHY, and the current transmission bandwidth of the bundling group is insufficient to simultaneously transmit the plurality of service flows. In this case, in the embodiment of the application, the target service flow in the plurality of service flows is discarded to ensure normal transmission of the remaining service flow.

There may be a plurality of manners of selecting a service flow that needs to be discarded. For example, the service flow that needs to be discarded may be randomly selected from the plurality of service flows, or the service flow that needs to be discarded may be selected based on a QoS mechanism.

For example, in some embodiments, the discarding a target service flow in the plurality of service flows based on the current transmission bandwidth of the bundling group and a transmission bandwidth required for the plurality of service flows may include: discarding, by using a QoS mechanism of the flexible Ethernet, the target service flow in the plurality of service flows based on the current transmission bandwidth of the bundling group and the transmission bandwidth required for the plurality of service flows, where a priority of the discarded target service flow is lower than a priority of the remaining service flow other than the target service flow in the plurality of service flows.

Specifically, the transmitting end may include a TM module. When the current transmission bandwidth of the bundling group is obtained through calculation, the current transmission bandwidth of the bundling group may be fed back to the TM module. The TM module performs QoS control on the plurality of service flows to select the service flow that needs to be discarded.

In the embodiment of the application, QoS control is performed on the plurality of service flows based on priorities of the plurality of service flows, to preferentially ensure transmission of a service flow with a high priority.

Figure 6:
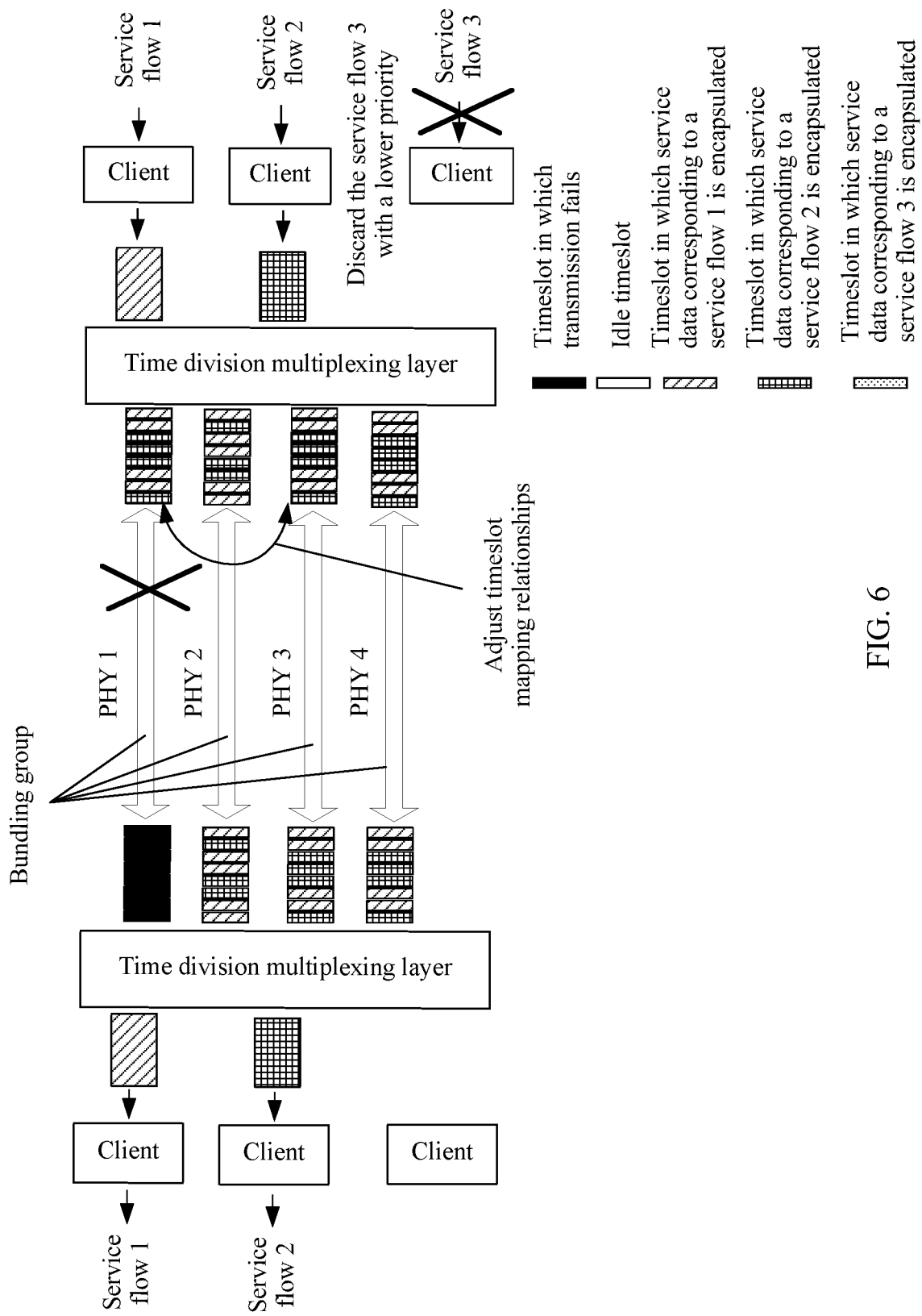
FIG. 6 is a schematic flowchart of a method for transmitting a service flow based on a flexible Ethernet according to another embodiment of the application.

With reference to FIG. 6, the following describes the foregoing embodiment by using an example. FIG. 6 is substantially similar to FIG. 2, and a difference lies in that an idle timeslot is mapped to the PHY 4 in FIG. 2 but a timeslot in which service data (service data of a service flow 1 and service data of a service flow 2) is encapsulated is mapped to a PHY 4 in FIG. 6.

It can be learned from FIG. 6 that when a PHY 1 fails, because there is no idle timeslot in 32 timeslots obtained through division performed in advance, a service flow 3 with a lower priority may be discarded, so that eight timeslots mapped to a PHY 3 are in an idle state. Then, a mapping relationship of eight timeslots mapped to the PHY 1 may be adjusted, so that the eight timeslots are mapped to the PHY 3. This is equivalent to discarding the service flow 3 to ensure transmission of the service flows 1 and 2 with higher priorities.

The following describes an apparatus embodiment of the application. Because the apparatus can perform the foregoing method, for a part not described in detail, refer to the foregoing method embodiments.

Figure 7:
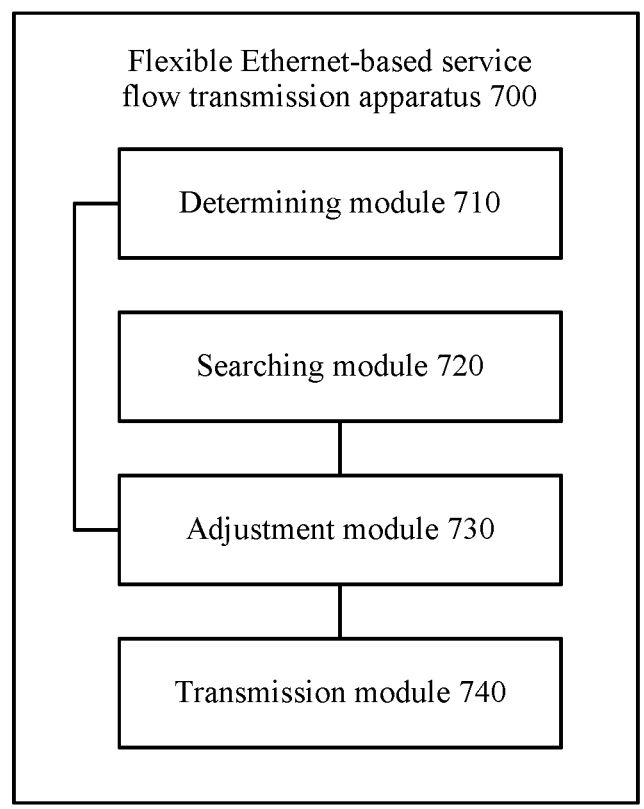
FIG. 7 is a schematic structural diagram of an apparatus for transmitting a service flow based on a flexible Ethernet according to an embodiment of the application.

FIG. 7 is a schematic structural diagram of a flexible Ethernet-based service flow transmission apparatus according to an embodiment of the application. The flexible Ethernet transmits at least one service flow by using a bundling group, a bandwidth resource corresponding to the bundling group is divided into M timeslots, service data of the at least one service flow is encapsulated in N timeslots in the M timeslots, each timeslot in the N timeslots is mapped to one PHY in the bundling group, and service data encapsulated in each timeslot is transmitted by using a PHY to which the timeslot is mapped. Both M and N are integers greater than or equal to 1, and M≥N. An apparatus 700 in FIG. 7 includes: a determining module 710, configured to: when a first PHY in the bundling group fails, determine, based on a preconfigured first timeslot configuration table, a target timeslot in the N timeslots that is mapped to the first PHY, where the first timeslot configuration table is used to indicate a mapping relationship between the M timeslots and PHYs in the bundling group; a searching module 720, configured to search the M timeslots for an idle timeslot based on the first timeslot configuration table; an adjustment module 730, configured to adjust the first timeslot configuration table when a quantity of idle timeslots in the M timeslots is greater than or equal to a quantity of target timeslots, so that all the N timeslots are mapped to other PHYs other than the first PHY in the bundling group, to obtain a second timeslot configuration table; and a transmission module 740, configured to transmit the at least one service flow based on the second timeslot configuration table by using the bundling group.

In the embodiment of the application, when the first PHY in the bundling group fails, the timeslots are first searched for the idle timeslot, and the first timeslot configuration table is adjusted when the quantity of idle timeslots is sufficient, so that all the N timeslots carrying the service data are mapped to other valid PHYs in the bundling group. In this way, all the service data encapsulated in the N timeslots can be smoothly transmitted to a receiving end, and service flow interruption is avoided.

Optionally, in some embodiments, the adjustment module 730 is specifically configured to: select K idle timeslots from the M timeslots when the quantity of idle timeslots in the M timeslots is greater than or equal to the quantity of target timeslots, where K is equal to the quantity of target timeslots; and adjust the first timeslot configuration table, so that a mapping relationship between the K idle timeslots and PHYs in the bundling group and a mapping relationship between the K target timeslots and PHYs in the bundling group are interchangeable.

Optionally, in some embodiments, the adjustment module 730 is specifically configured to select the K idle timeslots from the M timeslots based on load conditions of the other PHYs when the quantity of idle timeslots in the M timeslots is greater than or equal to the quantity of target timeslots.

Optionally, in some embodiments, the at least one service flow includes a plurality of service flows, and the apparatus 700 further includes: a calculation module, configured to calculate a current transmission bandwidth of the bundling group when the quantity of idle timeslots in the M timeslots is less than the quantity of target timeslots, where the current transmission bandwidth of the bundling group is equal to a sum of transmission bandwidths of the other PHYs other than the first PHY in the bundling group; and a service processing module, configured to discard a target service flow in the plurality of service flows based on the current transmission bandwidth of the bundling group and a transmission bandwidth required for the plurality of service flows, so that a transmission bandwidth required for a remaining service flow other than the target service flow in the plurality of service flows is less than or equal to the current transmission bandwidth of the bundling group.

Optionally, in some embodiments, the service processing module is specifically configured to discard, by using a quality of service QoS mechanism of the flexible Ethernet, the target service flow in the plurality of service flows based on the current transmission bandwidth of the bundling group and the transmission bandwidth required for the plurality of service flows, where a priority of the target service flow is lower than a priority of the remaining service flow other than the target service flow in the plurality of service flows.

Figure 8:
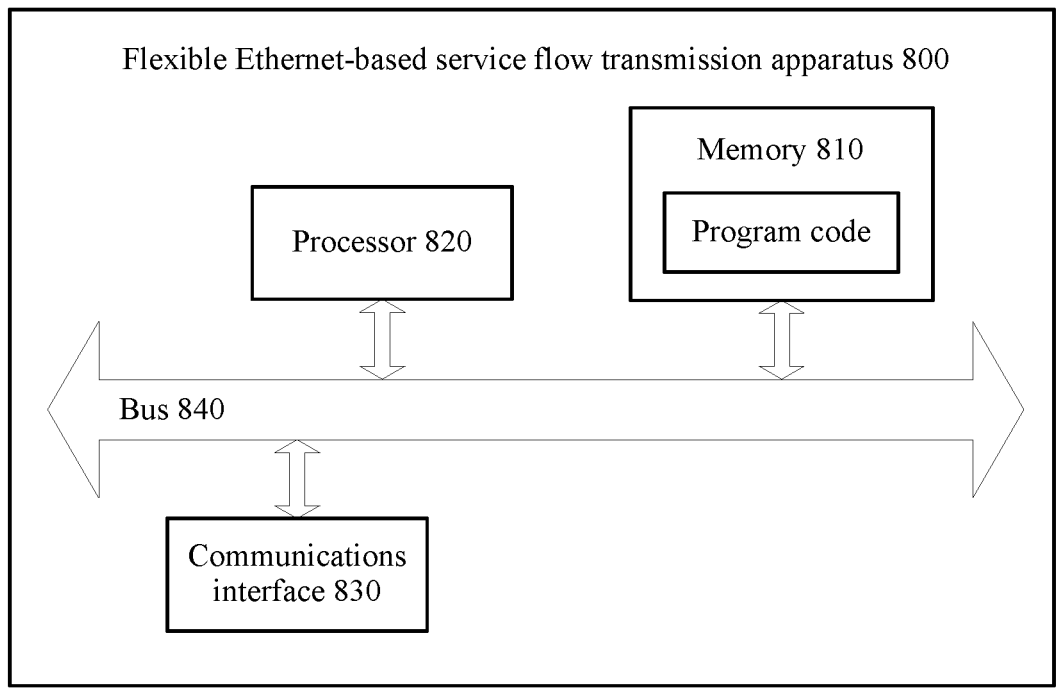
FIG. 8 is a schematic structural diagram of an apparatus for transmitting a service flow based on a flexible Ethernet according to another embodiment of the application.

FIG. 8 is a schematic structural diagram of a flexible Ethernet-based service flow transmission apparatus according to another embodiment of the application. The flexible Ethernet transmits at least one service flow by using a bundling group, a bandwidth resource corresponding to the bundling group is divided into M timeslots, service data of the at least one service flow is encapsulated in N timeslots in the M timeslots, each timeslot in the N timeslots is mapped to one PHY in the bundling group, and service data encapsulated in each timeslot is transmitted by using a PHY to which the timeslot is mapped. Both M and N are integers greater than or equal to 1, and M≥N. A flexible Ethernet-based service flow transmission apparatus 800 in FIG. 8 includes a memory 810, a processor 820, and a communications interface 830. The memory 810, the processor 82o, and the communications interface 830 are connected by using a bus 840. The processor 820 is corresponding to the determining module 710, the searching module 720, and the adjustment module 730 in FIG. 7. In other words, the processor 820 can perform operations performed by the determining module 710, the searching module 720, and the adjustment module 730 in FIG. 7. The communications interface 830 is corresponding to the transmission module 740 in FIG. 7. In other words, the communications interface 830 can perform the operation performed by the transmission module 740 in FIG. 7. The following describes the memory 810, the processor 820, and the communications interface 830 in detail.

The memory 810 is configured to store program code.

The processor 820 is configured to execute the program code stored in the memory 810. When the program code is executed, the processor 820 is configured to: when a first PHY in the bundling group fails, determine, based on a preconfigured first timeslot configuration table, a target timeslot in the N timeslots that is mapped to the first PHY, where the first timeslot configuration table is used to indicate a mapping relationship between the M timeslots and PHYs in the bundling group; search the M timeslots for an idle timeslot based on the first timeslot configuration table; and adjust the first timeslot configuration table when a quantity of idle timeslots in the M timeslots is greater than or equal to a quantity of target timeslots, so that all the N timeslots are mapped to other PHYs other than the first PHY in the bundling group, to obtain a second timeslot configuration table.

The transmission interface 830 is configured to transmit the at least one service flow based on the second timeslot configuration table by using the bundling group.

In the embodiment of the application, when the first PHY in the bundling group fails, the timeslots are first searched for the idle timeslot, and the first timeslot configuration table is adjusted when the quantity of idle timeslots is sufficient, so that all the N timeslots carrying the service data are mapped to other valid PHYs in the bundling group. In this way, all the service data encapsulated in the N timeslots can be smoothly transmitted to a receiving end, and service flow interruption is avoided.

Optionally, in some embodiments, the processor 820 is specifically configured to: select K idle timeslots from the M timeslots when the quantity of idle timeslots in the M timeslots is greater than or equal to the quantity of target timeslots, where K is equal to the quantity of target timeslots; and adjust the first timeslot configuration table, so that a mapping relationship between the K idle timeslots and PHYs in the bundling group and a mapping relationship between the K target timeslots and PHYs in the bundling group are interchangeable.

Optionally, in some embodiments, the processor 820 is specifically configured to select the K idle timeslots from the M timeslots based on load conditions of the other PHYs when the quantity of idle timeslots in the M timeslots is greater than or equal to the quantity of target timeslots.

Optionally, in some embodiments, the processor 820 is further configured to: calculate a current transmission bandwidth of the bundling group when the quantity of idle timeslots in the M timeslots is less than the quantity of target timeslots, where the current transmission bandwidth of the bundling group is equal to a sum of transmission bandwidths of the other PHYs other than the first PHY in the bundling group; and discard a target service flow in the plurality of service flows based on the current transmission bandwidth of the bundling group and a transmission bandwidth required for the plurality of service flows, so that a transmission bandwidth required for a remaining service flow other than the target service flow in the plurality of service flows is less than or equal to the current transmission bandwidth of the bundling group.

Optionally, in some embodiments, the processor 820 is specifically configured to discard, by using a quality of service QoS mechanism of the flexible Ethernet, the target service flow in the plurality of service flows based on the current transmission bandwidth of the bundling group and the transmission bandwidth required for the plurality of service flows, where a priority of the target service flow is lower than a priority of the remaining service flow other than the target service flow in the plurality of service flows.

It should be understood that the foregoing service flow transmission apparatus 800 may be a network device in the flexible Ethernet, for example, may be a routing device in the flexible Ethernet, or may be a board in a routing device.

Figure 9:
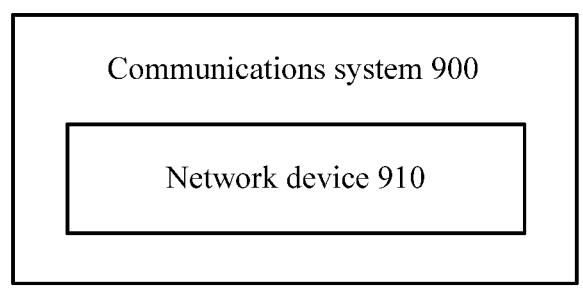
FIG. 9 is a schematic structural diagram of a communications system according to an embodiment of the application.

FIG. 9 is a schematic structural diagram of a communications system according to an embodiment of the application. A communications system 900 in FIG. 9 may include a flexible Ethernet-based network device 910. The flexible Ethernet transmits at least one service flow by using a bundling group, a bandwidth resource corresponding to the bundling group is divided into M timeslots, service data of the at least one service flow is encapsulated in N timeslots in the M timeslots, each timeslot in the N timeslots is mapped to one PHY in the bundling group, and service data encapsulated in each timeslot is transmitted by using a PHY to which the timeslot is mapped. Both M and N are integers greater than or equal to 1, and M≥N. The network device 910 may be corresponding to the service flow transmission apparatus 800 described in FIG. 8. In other words, the network device 910 may perform the operations performed by the service flow transmission apparatus 800. Specific descriptions are as follows.

The network device 910 is configured to: when a first PHY in the bundling group fails, determine, based on a preconfigured first timeslot configuration table, a target timeslot in the N timeslots that is mapped to the first PHY, where the first timeslot configuration table is used to indicate a mapping relationship between the M timeslots and PHYs in the bundling group.

The network device 910 is further configured to: search the M timeslots for an idle timeslot based on the first timeslot configuration table; and adjust the first timeslot configuration table when a quantity of idle timeslots in the M timeslots is greater than or equal to a quantity of target timeslots, so that all the N timeslots are mapped to other PHYs other than the first PHY in the bundling group, to obtain a second timeslot configuration table.

The network device 910 is further configured to transmit the at least one service flow based on the second timeslot configuration table by using the bundling group In the embodiment of the application, when the first PHY in the bundling group fails, the timeslots are first searched for the idle timeslot, and the first timeslot configuration table is adjusted when the quantity of idle timeslots is sufficient, so that all the N timeslots carrying the service data are mapped to other valid PHYs in the bundling group. In this way, all the service data encapsulated in the N timeslots can be smoothly transmitted to a receiving end, and service flow interruption is avoided.

Optionally, in some embodiments, the network device 910 may be specifically configured to: select K idle timeslots from the M timeslots when the quantity of idle timeslots in the M timeslots is greater than or equal to the quantity of target timeslots, where K is equal to the quantity of target timeslots; and adjust the first timeslot configuration table, so that a mapping relationship between the K idle timeslots and PHYs in the bundling group and a mapping relationship between the K target timeslots and PHYs in the bundling group are interchangeable.

Optionally, in some embodiments, the network device 910 may be specifically configured to select the K idle timeslots from the M timeslots based on load conditions of the other PHYs when the quantity of idle timeslots in the M timeslots is greater than or equal to the quantity of target timeslots.

Optionally, in some embodiments, the at least one service flow includes a plurality of service flows, and the network device 910 may be further configured to: calculate a current transmission bandwidth of the bundling group when the quantity of idle timeslots in the M timeslots is less than the quantity of target timeslots, where the current transmission bandwidth of the bundling group is equal to a sum of transmission bandwidths of the other PHYs other than the first PHY in the bundling group; and discard a target service flow in the plurality of service flows based on the current transmission bandwidth of the bundling group and a transmission bandwidth required for the plurality of service flows, so that a transmission bandwidth required for a remaining service flow other than the target service flow in the plurality of service flows is less than or equal to the current transmission bandwidth of the bundling group.

Optionally, in some embodiments, the network device 910 may be specifically configured to discard, by using a quality of service QoS mechanism of the flexible Ethernet, the target service flow in the plurality of service flows based on the current transmission bandwidth of the bundling group and the transmission bandwidth required for the plurality of service flows, where a priority of the target service flow is lower than a priority of the remaining service flow other than the target service flow in the plurality of service flows.

A person of ordinary skill in the art may be aware that, in combination with the examples described in the embodiments disclosed in the specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in the application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the application essentially, or the part contributing to the prior art, or some of the technical solutions may be implemented in a form of a software product. The software product is stored in a storage medium, and includes several instructions for instructing a computer device (which may be a personal computer, a server, a network device, or the like) to perform all or some of the steps of the methods described in the embodiments of the application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for transmitting a service flow based on a flexible Ethernet, the method comprising:
    when a first PHY in a bundling group fails, determining, based on a preconfigured first timeslot configuration table, K target timeslot(s) in N timeslots that is mapped to the first PHY, at least one service flow is being transmitted on the flexible Ethernet by using the bundling group, a bandwidth resource corresponding to the bundling group corresponds to M timeslots, service data of the at least one service flow is encapsulated in the N timeslots in the M timeslots, each timeslot in the N timeslots is mapped to one PHY in the bundling group, and service data encapsulated in a timeslot is transmitted by using a PHY to which the timeslot is mapped, M being an integer greater than 1, and N being an integer greater than or equal to 1, and M≤N, the first timeslot configuration table comprising a mapping relationship between the M timeslots and PHYs in the bundling group, K is an integer greater than or equal to 1;
    determining K idle timeslots in the M timeslot(s), based on the first timeslot configuration table; and
    transmitting service data corresponding to the K target timeslot(s) by using the K idle timeslot(s).

2. The method according to claim 1, wherein the determining K idle timeslot(s) in the M timeslots comprises:
    selecting the K idle timeslots in the M timeslots when the quantity of idle timeslots in the M timeslots is greater than or equal to the quantity of target timeslots; and
    adjusting the first timeslot configuration table, so that a mapping relationship between the K idle timeslots and PHYs in the bundling group and a mapping relationship between the K target timeslots and PHYs in the bundling group are interchangeable.

3. The method according to claim 2, wherein the selecting K idle timeslots from the M timeslots when the quantity of idle timeslots in the M timeslots is greater than or equal to the quantity of target timeslots comprises:
    selecting the K idle timeslots from the M timeslots based on load conditions of the other PHYs when the quantity of idle timeslots in the M timeslots is greater than or equal to the quantity of target timeslots.

4. The method according to claim 3, wherein the at least one service flow comprises a plurality of service flows; and the method further comprises:
    calculating a current transmission bandwidth of the bundling group when the quantity of idle timeslots in the M timeslots is less than the quantity of target timeslots, wherein the current transmission bandwidth of the bundling group is equal to a sum of transmission bandwidths of the other PHYs other than the first PHY in the bundling group; and
    discarding a target service flow in the plurality of service flows based on the current transmission bandwidth of the bundling group and a transmission bandwidth required for the plurality of service flows, so that a transmission bandwidth required for a remaining service flow other than the target service flow in the plurality of service flows is less than or equal to the current transmission bandwidth of the bundling group.

5. The method according to claim 4, wherein the discarding a target service flow in the plurality of service flows based on the current transmission bandwidth of the bundling group and a transmission bandwidth required for the plurality of service flows comprises:

discarding, by using a quality of service (QoS) mechanism of the flexible Ethernet, the target service flow in the plurality of service flows based on the current transmission bandwidth of the bundling group and the transmission bandwidth required for the plurality of service flows, wherein a priority of the target service flow is lower than a priority of the remaining service flow other than the target service flow in the plurality of service flows.

6. The method according to claim 2, wherein the at least one service flow comprises a plurality of service flows; and the method further comprises:

calculating a current transmission bandwidth of the bundling group when the quantity of idle timeslots in the M timeslots is less than the quantity of target timeslots, wherein the current transmission bandwidth of the bundling group is equal to a sum of transmission bandwidths of the other PHYs other than the first PHY in the bundling group; and discarding a target service flow in the plurality of service flows based on the current transmission bandwidth of the bundling group and a transmission bandwidth required for the plurality of service flows, so that a transmission bandwidth required for a remaining service flow other than the target service flow in the plurality of service flows is less than or equal to the current transmission bandwidth of the bundling group.

7. The method according to claim 6, wherein the discarding a target service flow in the plurality of service flows based on the current transmission bandwidth of the bundling group and a transmission bandwidth required for the plurality of service flows comprises:

discarding, by using a quality of service (QoS) mechanism of the flexible Ethernet, the target service flow in the plurality of service flows based on the current transmission bandwidth of the bundling group and the transmission bandwidth required for the plurality of service flows, wherein a priority of the target service flow is lower than a priority of the remaining service flow other than the target service flow in the plurality of service flows.

8. The method according to claim 1, wherein the at least one service flow comprises a plurality of service flows; and the method further comprises:

calculating a current transmission bandwidth of the bundling group when the quantity of idle timeslots in the M timeslots is less than the quantity of target timeslots, wherein the current transmission bandwidth of the bundling group is equal to a sum of transmission bandwidths of the other PHYs other than the first PHY in the bundling group; and discarding a target service flow in the plurality of service flows based on the current transmission bandwidth of the bundling group and a transmission bandwidth required for the plurality of service flows, so that a transmission bandwidth required for a remaining service flow other than the target service flow in the plurality of service flows is less than or equal to the current transmission bandwidth of the bundling group.

9. The method according to claim 8, wherein the discarding a target service flow in the plurality of service flows based on the current transmission bandwidth of the bundling group and a transmission bandwidth required for the plurality of service flows comprises:

discarding, by using a quality of service (QoS) mechanism of the flexible Ethernet, the target service flow in the plurality of service flows based on the current transmission bandwidth of the bundling group and the transmission bandwidth required for the plurality of service flows, wherein a priority of the target service flow is lower than a priority of the remaining service flow other than the target service flow in the plurality of service flows.

10. A flexible Ethernet-based service flow transmission apparatus comprising:

a processor;

a memory storing a program to be executed in the processor, the program comprising instructions to:

when a first PHY in a bundling group fails, determine, based on a preconfigured first timeslot configuration table, K target timeslot(s) in N timeslots that is mapped to the first PHY, wherein at least one service flow is transmitted on the flexible Ethernet by using the bundling group, a bandwidth resource corresponding to the bundling group corresponds to M timeslots, service data of the at least one service flow is encapsulated in the N timeslots in the M timeslots, each timeslot in the N timeslots is mapped to one PHY in the bundling group, and service data encapsulated in a timeslot is transmitted by using a PHY to which the timeslot is mapped, wherein M is an integer greater than 1, and N is an integer greater than or equal to 1, and M≤N, wherein the first timeslot configuration table comprises a mapping relationship between the M timeslots and PHYs in the bundling group, K is an integer greater than or equal to 1;

determine K idle timeslot(s) in the M timeslots, based on the first timeslot configuration table; and transmit service data corresponding to the K target timeslot(s) by using the K idle timeslot(s).

11. The apparatus according to claim 10, wherein the instructions to determine the K idle timeslot(s) comprise instructions to:

select the K idle timeslots in the M timeslots when the quantity of idle timeslots in the M timeslots is greater than or equal to the quantity of target timeslots; and adjust the first timeslot configuration table, so that a mapping relationship between the K idle timeslots and PHYs in the bundling group and a mapping relationship between the K target timeslots and PHYs in the bundling group are interchangeable.

12. The apparatus according to claim 11, wherein the instructions to select the K idle timeslots in the M timeslots comprise instructions to select the K idle timeslots from the M timeslots based on load conditions of the other PHYs when the quantity of idle timeslots in the M timeslots is greater than or equal to the quantity of target timeslots.

13. The apparatus according to claim 12, wherein the at least one service flow comprises a plurality of service flows, and the program comprises further instructions to:

calculate a current transmission bandwidth of the bundling group when the quantity of idle timeslots in the M timeslots is less than the quantity of target timeslots, wherein the current transmission bandwidth of the bundling group is equal to a sum of transmission bandwidths of the other PHYs other than the first PHY in the bundling group; and discard a target service flow in the plurality of service flows based on the current transmission bandwidth of the bundling group and a transmission bandwidth required for the plurality of service flows, so that a transmission bandwidth required for a remaining service flow other than the target service flow in the plurality of service flows is less than or equal to the current transmission bandwidth of the bundling group.

14. The apparatus according to claim 13, wherein the instructions to discard the target service flow comprise instruction to discard, by using a quality of service (QoS) mechanism of the flexible Ethernet, the target service flow in the plurality of service flows based on the current transmission bandwidth of the bundling group and the transmission bandwidth required for the plurality of service flows, wherein a priority of the target service flow is lower than a priority of the remaining service flow other than the target service flow in the plurality of service flows.

15. The apparatus according to claim 10, wherein the at least one service flow comprises a plurality of service flows, and the program further comprises instructions to:

calculate a current transmission bandwidth of the bundling group when the quantity of idle timeslots in the M timeslots is less than the quantity of target timeslots, wherein the current transmission bandwidth of the bundling group is equal to a sum of transmission bandwidths of the other PHYs other than the first PHY in the bundling group; and discard a target service flow in the plurality of service flows based on the current transmission bandwidth of the bundling group and a transmission bandwidth required for the plurality of service flows, so that a transmission bandwidth required for a remaining service flow other than the target service flow in the plurality of service flows is less than or equal to the current transmission bandwidth of the bundling group.

16. The apparatus according to claim 15, wherein the instructions to discard the target service flow comprise instructions to discard, by using a quality of service (QoS) mechanism of the flexible Ethernet, the target service flow in the plurality of service flows based on the current transmission bandwidth of the bundling group and the transmission bandwidth required for the plurality of service flows, wherein a priority of the target service flow is lower than a priority of the remaining service flow other than the target service flow in the plurality of service flows.

17. The apparatus according to claim 11, wherein the at least one service flow comprises a plurality of service flows, and the program further comprises instructions to:

calculate a current transmission bandwidth of the bundling group when the quantity of idle timeslots in the M timeslots is less than the quantity of target timeslots, wherein the current transmission bandwidth of the bundling group is equal to a sum of transmission bandwidths of the other PHYs other than the first PHY in the bundling group; and discard a target service flow in the plurality of service flows based on the current transmission bandwidth of the bundling group and a transmission bandwidth required for the plurality of service flows, so that a transmission bandwidth required for a remaining service flow other than the target service flow in the plurality of service flows is less than or equal to the current transmission bandwidth of the bundling group.

18. The apparatus according to claim 17, wherein the instructions to discard the target service flow comprise instruction to discard, by using a quality of service (QoS) mechanism of the flexible Ethernet, the target service flow in the plurality of service flows based on the current transmission bandwidth of the bundling group and the transmission bandwidth required for the plurality of service flows, wherein a priority of the target service flow is lower than a priority of the remaining service flow other than the target service flow in the plurality of service flows.

19. A communications system, comprising a flexible Ethernet-based network device, wherein at least one service flow is transmitted on the flexible Ethernet by using a bundling group, a bandwidth resource corresponding to the bundling group corresponds M timeslots, service data of the at least one service flow is encapsulated in N timeslots in the M timeslots, each timeslot in the N timeslots is mapped to one PHY in the bundling group, and service data encapsulated in a timeslot is transmitted by using a PHY to which the timeslot is mapped, wherein M is an integer greater than 1, and N is an integer greater than or equal to 1, and M≤N; and the network device is configured to: when a first PHY in the bundling group fails, determine, based on a preconfigured first timeslot configuration table, K target timeslot(s) in the N timeslots that is mapped to the first PHY, wherein the first timeslot configuration table comprises a mapping relationship between the M timeslots and PHYs in the bundling group, K is an integer greater than or equal to 1;

the network device is further configured to determine K idle timeslot(s) in the M timeslots, based on the first timeslot configuration table; and the network device is further configured to transmit service data corresponding to the K target timeslot(s) by using the K idle timeslot(s).

20. A non-transitory computer readable medium, where the non-transitory computer readable medium is applied for transmitting a service flow based on a flexible Ethernet, wherein at least one service flow is transmitted on the flexible Ethernet by using a bundling group, a bandwidth resource corresponding to the bundling group is distributed into M timeslots, service data of the at least one service flow is encapsulated in N timeslots in the M timeslots, each timeslot in the N timeslots is mapped to one PHY in the bundling group, and service data encapsulated in a timeslot is transmitted by using a PHY to which the timeslot is mapped, wherein M is an integer greater than 1, and N is an integer greater than or equal to 1, and M≤N; and the non-transitory computer readable medium comprises instructions which, when executed by a computer, cause the computer to carry out steps:

when a first PHY in the bundling group fails, determining, based on a preconfigured first timeslot configuration table, K target timeslot(s) in the N timeslots that is mapped to the first PHY, wherein the first timeslot configuration table comprises a mapping relationship between the M timeslots and PHYs in the bundling group, K is an integer greater than or equal to 1;

determining K idle timeslot(s) in the M timeslots, based on the first timeslot configuration table; and transmitting service data corresponding to the K target timeslot(s) by using the K idle timeslot(s).

* * * * *

UNITED STATES PATENT AND TRADEMARK OFFICE
CERTIFICATE OF CORRECTION

PATENT NO. : 11,496,405 B2
APPLICATION NO. : 17/308529
DATED : November 8, 2022
INVENTOR(S) : Rensheng Ji It is certified that error appears in the above-identified patent and that said Letters Patent is hereby corrected as shown below:

In the Claims

Claim 1, Column 16, Line 25; delete "$M \leq N$" and insert --$M \geq N$--.

Claim 4, Column 16, Line 52; delete "3" and insert --1--.

Claim 8, Column 17, Line 52; delete "1" and insert --3--.

Claim 10, Column 18, Line 36; delete "$M \leq N$" and insert --$M \geq N$--.

Claim 13, Column 18, Line 62; delete "12" and insert --10--.

Claim 13, Column 18, Line 64; delete "comprises further" and insert --further comprises--.

Claim 14, Column 19, Line 15; delete "instruction" and insert --instructions--.

Claim 15, Column 19, Line 24; delete "10" and insert --11--.

Claim 16, Column 19, Line 43; delete "instructions" and insert --instruction--.

Claim 17, Column 19, Line 52; delete "11" and insert --12--.

Claim 17, Column 19, Line 54; delete "further comprises" and insert --comprises further--.

Claim 19, Column 20, Line 24; delete "$M \leq N$" and insert --$M \geq N$--.

Claim 20, Column 20, Line 53; delete "$M \leq N$" and insert --$M \geq N$--.

Signed and Sealed this
Third Day of January, 2023

Katherine Kelly Vidal
*Director of the United States Patent and Trademark Office*